C. W. Saladee,
Making Pottery.
N° 47,043. Patented Mar. 28, 1865.

Witnesses:
E. A. Saladee
John M. Murray

Inventor:
Chas. W. Saladee

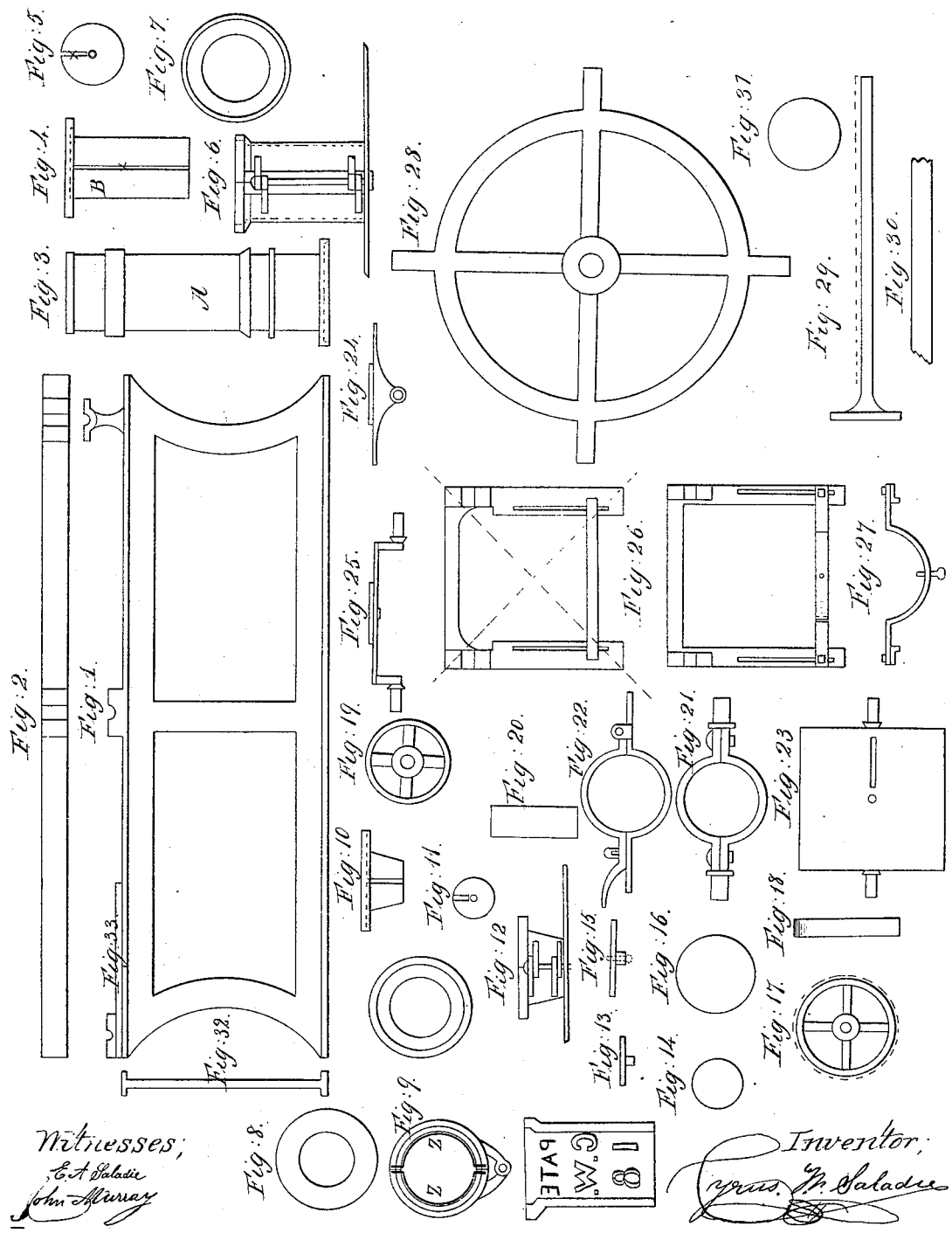

C. W. Saladee,
Making Pottery.
N° 47,043.   Patented Mar. 28, 1865.
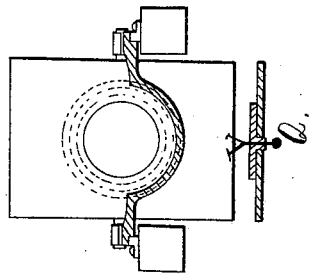
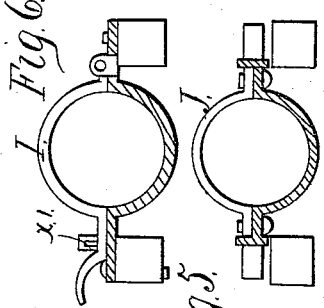
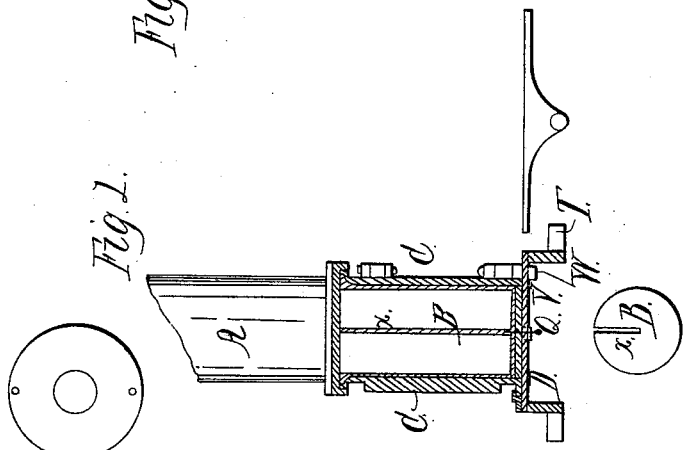
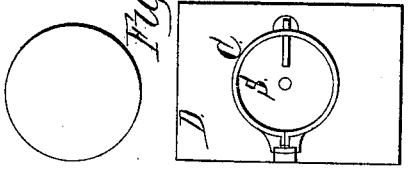
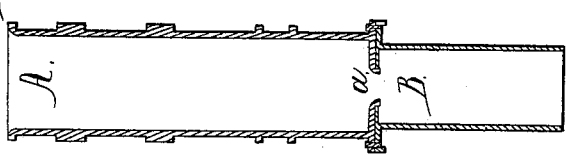
Witnesses:
E. A. Saladee
John M. Murray
Inventor:
Cyrus W. Saladee

UNITED STATES PATENT OFFICE.

CYRUS W. SALADEE, OF PUTNAM, OHIO.

IMPROVED MACHINE FOR MAKING EARTHENWARE.

Specification forming part of Letters Patent No. 47,043, dated March 28, 1865.

*To all whom it may concern:*

Be it known that I, CYRUS W. SALADEE, of Putnam, Muskingum county, in the State of Ohio, have invented certain new and useful Improvements in Machinery for Making Earthenware such as Pots, Jars, Pans, &c.; and I do hereby declare that the following is a full and exact description thereof, reference being had to the accompanying drawings, and to the letters of reference thereon marked.

Figure 1:
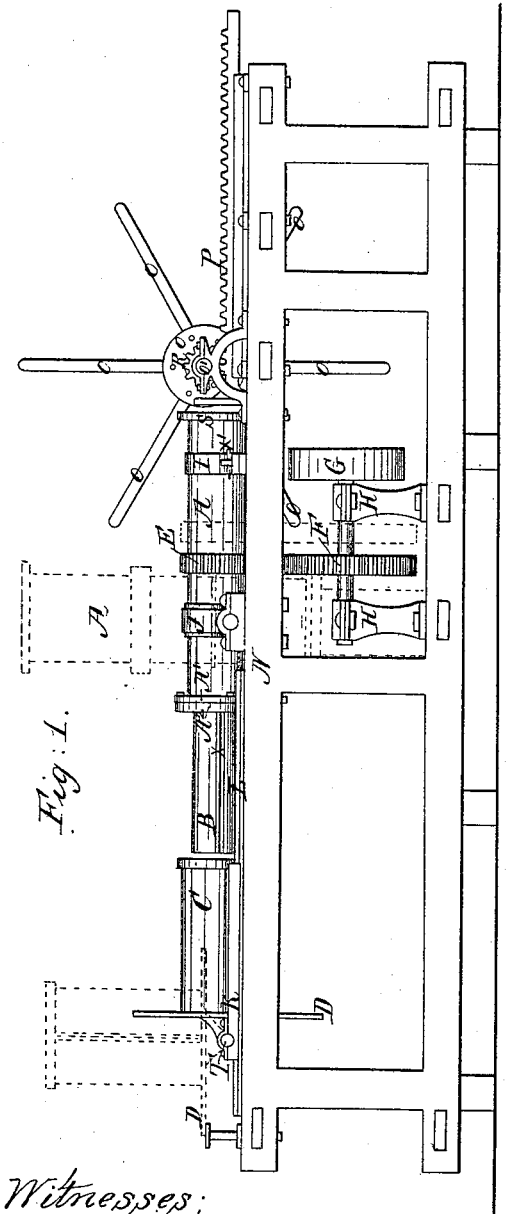
Figure 2:
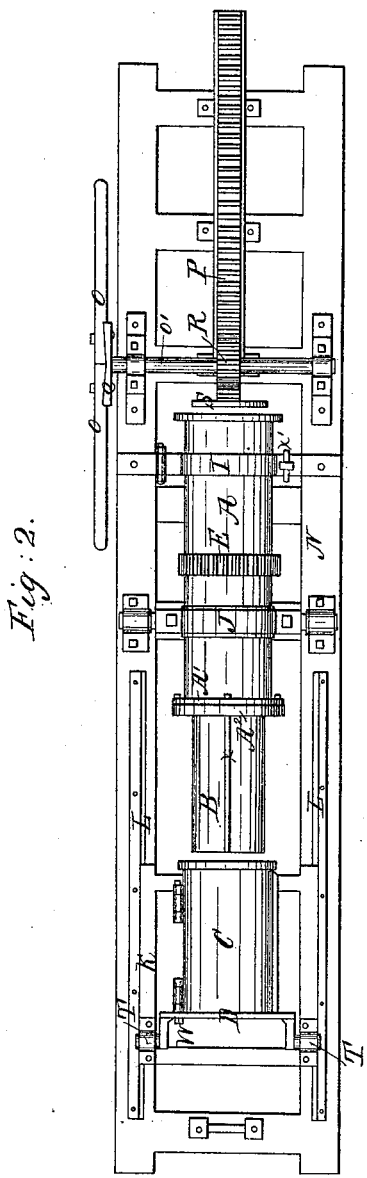

In the drawings, Plate I has two figures. Figure 1 is a side elevation of the machine. Fig. 2 is a plan view of the same. Plate II has thirty-two figures. Fig. 1 is a side elevation of frame supporting the machine. Fig. 2 is a plan view of the same. Fig. 32 is an end view of the same. Fig. 3 shows the cylinder. Fig. 4 shows the plunger for large jars. Fig. 5 shows the bottom of the same; Fig. 6, view of mold for large jars; Fig. 7, end view of cylinder, showing projecting rim for the reception of plunger; Fig. 8, top of plunger; Fig. 9, top view of mold for large jars; Fig. 10, plunger for milk-pans, showing crevice; Fig. 11, bottom view of same; Fig. 12, mold for milk-pans; Figs. 13, 14, 15, and 16, views of the adjustable bottoms for milk-pan or large jar, molds; Figs. 17 and 18, cog-wheel; Figs. 19 and 20, belt-wheel. Figs. 21 and 22 show the yokes in which the cylinder revolves. Figs. 23, 24, and 25 show the revolving table upon which the mold is set; Fig 26, top view of the movable frame supporting the revolving table. Fig. 27——Fig. 28, shows the wheel which operates the pressing-plunger. Figs. 29, 30 and 31 show the pressing-plunger. Plate III has six figures. Fig. 1 is a section through the plunger and inclosing-mold. Fig. 2 is a section through the feed-cylinder and plunger. Fig. 3 is a plan of mold and mold-table. Fig. 4 shows the mold-table vertical, and also shows the movable bottom V. Fig. 5 shows the yoke in which the cylinder revolves. Fig. 6 shows the yoke which holds the cylinder in its horizontal position.

To enable those skilled in the art to make and use my invention, I will describe its nature, construction, and operation.

The nature of my invention consists, principally, in the following points: First, in constructing my machine for forming earthenware so that it shall be self-feeding and self-gaging, so as to avoid the necessity of measuring or weighing the clay for each vessel, as is the common custom. Also, in pressing the clay through a suitable crevice of a hollow plunger into the mold, so as to form the vessel in the space between the plunger and the mold. Also, in the use of a "vent-pin," projecting through the bottom of the ware, said pin being withdrawn after the vessel is formed, in order to avoid the "suction" which would otherwise prevent the removal of the bottom of the jar from the bottom of the mold. Also, in the improved mode of lining the molds with woolen fabrics, so as to prevent the too close adhesion of the clay to the mold. Also, in the mode of lettering or ornamenting the exterior of vessels by my stitching or otherwise attaching suitable devices to the lining of the mold. Also, in so arranging the feeding-cylinder as to enable it to take a vertical position, for the purpose of being filled with the prepared clay. Also, in attaching forming-plungers of various sizes and shapes to the feed-cylinder. Also, in the improved mode of constructing and operating the molds, being in a horizontal position while forming the vessel, and being vertical after the vessel is formed and opening at the side so as to admit of ready removal of the vessel. Also, in sliding the mold up against the forming-plunger. Also, in the construction and arrangement of the table upon which the mold is set.

I will first give a brief general description of my invention, and then set it forth in detail.

In the ordinary modes of making earthenware it is necessary to expend much time and labor in weighing the clay for each vessel and forming it into a "ball," in order to obtain the desired thickness of the vessel. All this labor is saved by my invention.

I provide a hollow cylinder revolving in appropriate bearings, so arranged that the cylinder may be put into a vertical position to be charged with the prepared clay, and also be put into a horizontal position when in the act of forming a jar. One end of this cylinder is provided with a smaller cylinder, which constitutes a hollow plunger. There is a crevice cut longitudinally through the plunger of a width equal to the intended thickness of the jar. The outer end of the plunger is provided with a head, and the crevice through the side of the plunger is continued half through or across the head. The mold is of a cylindrical, conical, or other suitable shape similar and concentric with the former or plunger, and enough larger than the plunger to allow the thickness of the wall of the jar between the mold and the plunger. The mold is set upon a sliding table so as to run it up to and around the plunger, and also to run it away, to turn it up, and to open it in halves, so as to remove the jar. The clay, being properly tempered, is put into the receiving-cylinder, which is then vertical. The cylinder is then made horizontal, and made to revolve at a moderate speed. The mold is then slid up and secured so that it surrounds the plunger, leaving an annular space between the mold and plunger, and a short cylindrical space between the bottom of the mold and the head of the plunger, these spaces being equal to the desired thickness of the jar. A rack and plunger operating in the cylinder is then made to force with considerable pressure the clay from the cylinder into the hollow plunger, and out through its crevice into the space between the mold and plunger, thus forming the jar. The mold is now withdrawn and turned up, the top of the jar trimmed off, the mold opened, and the jar removed ready for drying and baking.

In the drawings, A represents the receiving or feed cylinder of a diameter somewhat greater than the diameter of the largest vessel to be made, and of such a length as to give it a capacity of holding enough clay to form a considerable number of jars or other vessels. This cylinder is provided with a yoke, J, in which it revolves, said yoke turning on its axes which have their bearings on the sides N of the frame. By means of this turning yoke I am enabled to give either a vertical or horizontal position to cylinder A. The outer end of the cylinder also revolves in a yoke, I, the upper half of this yoke being hinged so as to open and close for the purpose of receiving and holding the cylinder in its horizontal position. The opening $a$ at the bottom of the cylinder is smaller than the mouth of the cylinder.

B is the forming-plunger, and is secured by set-screws to the bottom of the cylinder, so as to revolve with and as a part of the said cylinder. $x$ is a crevice, (in width equal to the thickness of the wall of the jar,) and extends through the side of the plunger B from its top to its bottom, and half-way across the head of the plunger.

E is the cog-wheel surrounding the cylinder and through which the cylinder is made to revolve.

S is the pressing-plunger which operates as a piston for forcing the clay out of the cylinder through the forming-plunger into the mold. Plunger S is operated by a suitable rack and pinion and operating-levers.

C represents the mold, made in halves, and provided with hinges and clasps, so as to open and close. It corresponds in size and shape with the forming-plunger, being, however, enough larger than it to allow the clay that forms the vessel to enter between the plungers and its, (the mold's,) internal surface. The mold is secured to its table by a set-screw, $w$. In Fig. 9, Plate II, the red lines $z$ show the lining of the mold. I form this lining out of felt or other woolen or suitable fabric. I use one piece for each half of the mold and secure it to the lap edges only of the mold, so that the lining shall not adhere closely to the mold, except at the edges where fastened. Experience has taught me that a woolen fabric does not adhere to the clay in the same mischievous degree as does rubber or cotton cloth. When the mold is opened, the lining adheres partially to the clay, so that it is drawn away from the sides of the mold in such a manner that I can readily pull it away from the jar without injury thereto.

D is the sliding and revolving mold-table, by which the mold can be slid up to and from the plunger and be turned horizontal or vertical. By stitching or otherwise attaching raised letters or other designs out of strips of cloth or other material upon the lining I can produce any desired mark, letter, or ornament upon the jar.

It will here be understood that I contemplate using molds and their corresponding plungers of many different sizes and shapes. All that has to be done, when I wish to change the style or size of vessel being made is to attach a suitable mold to the mold-table and its corresponding forming-plunger to the feed-cylinder. It is only necessary to fasten the lining as above described to molds for straight or cylindrical ware. For flaring or conical ware the lining may be glued to the whole surface of the mold. Each mold is to be provided with a movable bottom, V, having a stud upon its under side fitting into a hole in the mold-table. The object of this movable bottom is to center the mold.

Q is the vent-pin, and is a small pin which projects through the mold-table and movable bottom and up to the head of the plunger, so as to make a small hole in the center of the bottom of the vessel. When the vessel is formed, the pin is withdrawn so as to admit the atmosphere to the head of the plunger, in order that it may be easily withdrawn, and also to enable the bottom of the jar to be detached easily from the movable bottom. The hole in the bottom of the jar is closed by mashing into and around it a small piece of moist clay. By having suitable depressions in the molds I can form the necessary lugs or ears to vessels.

By my improved mode of making earthenware I can make jars, pots, pans, &c., more rapidly, more cheaply, better, and in a more uniform and even manner than has been done heretofore.

Having thus fully described my invention, what I claim as new, and desire to secure by Letters Patent, is—

1. Constructing a machine in the manner described, or its equivalent, so as to form earthenware without the necessity of weighing or measuring the clay.

2. The hollow forming-plunger B, or its equivalent, constructed and operating in the manner and for the purposes described.

3. The feeding-cylinder A, or its equivalent, constructed and operating in the manner and for the purposes described.

4. The molds C, when constructed and operating so as to open in halves vertically, as described.

5. The vent-pin Q, or its equivalent, constructed and operating as described.

6. The mold-table D, or its equivalent, constructed and operating as described.

7. Attaching the lining Z to the lap-edges of the mold when the lining is composed of woolen or other non elastic fabric and closely conforms to the shape of the mold, in the manner and for the purposes specified.

8. The made described, or its equivalent, of producing letters or designs upon the earthenware.

In testimony that I claim the above, I have hereunto subscribed my name.

CYRUS W. SALADEE.

Witnesses:
E. A. SALADEE,
JOHN MURRAY.